Patented Dec. 19, 1933

1,940,409

UNITED STATES PATENT OFFICE 1,940,409

LIQUID TREATMENT PROCESS

Gail J. Fink, Chicago, Ill., assignor to National Aluminate Corporation, Chicago, Ill., a corporation of Illinois No Drawing. Application December 4, 1931
Serial No. 579,118

7 Claims. (Cl. 210—23)

My invention relates to improvements in liquid treatment and is primarily adapted for the treatment of water which is to be softened and clarified. My process therefore concerns itself with water or other liquids from which hardness is to be removed and/or from which other dissolved and/or suspended materials are to be removed. The process is especially adapted to the treatment of water for the purpose of conditioning it for commercial application such as use in boilers, in industrial and chemical processes, and in connection with dyeing and other uses where it is desirable and frequently essential to have a water supply containing a minimum of dissolved and suspended matter.

Very commonly water is clarified and softened by the use of a zeolitic material which may be either synthetic or a processed or treated natural product. Other processes involve the use of lime or lime and soda ash and in some cases a combination of the zeolite treatment with a lime or lime soda ash pretreatment is used.

When water is treated by the zeolite process a direct exchange of the sodium of the zeolite for the calcium and magnesium of the water takes place and there is consequently no reduction in soluble salts though the hardness is decreased. In the lime or lime soda ash softening process the lime reacts with the calcium bicarbonate of the water to form calcium carbonate which is relatively insoluble and is therefore precipitated and may be removed by sedimentation or filtration to the limit of its true or colloidal solubility. However, the reaction of the soda ash with calcium sulphate in the water results merely in the exchange of sodium for calcium and in this respect there is no reduction of soluble salts.

When waters containing an appreciable concentration of soluble salts are used in boilers for steam production, the steam as it evaporates, leaves the soluble salts in the water. The quantity of solute and the total amount of insoluble salt in the boiler therefore rapidly increases and in order to maintain the concentration in the boiler low enough to prevent excessive foaming, excessive scale formation and other difficulties it becomes necessary either intermittently or continuously to draw off the soluble salt laden water from the boiler, replacing it by fresh water to maintain the concentration of salts in the boiler below some definite and critical value which is more or less characteristic of the water involved, the boiler and the operating conditions.

The blowing down or discharge of such water from the boiler results in a very serious heat loss because this water is drawn off at boiler temperature without doing any useful work and is replaced by cold water which must be heated either in the boiler or outside of it. Data collected by certain of the railroads shows that the cause of this continuous or intermittent blow down is so great that if feed water substantially free from dissolved solids can be used thereby greatly reducing the amount of water discharged by blow down, amounts to a saving of approximately four cents per pound of non-incrusting dissolved solids removed per thousand gallons of water.

I propose to treat water by the use of barium ferrite which as hereinafter will appear has both a softening action applicable to reduce soluble salts in the water and a coagulating and clarifying action applicable to and effective upon suspended material in the water.

The reagent which I propose is barium ferrite present in the product obtained commercially by heating a mixture consisting of a barium salt such as barium carbonate with iron oxide. The compound thus formed from chemically pure raw materials would be a barium ferrite but if natural ordinarily commercial raw materials are used, it may contain also barium silicate and barium silico-ferrite together with other natural impurities which under ordinary circumstances have no deleterious effect in connection with the carrying out of my treatment.

A typical analysis of such a product made from a natural witherite and a natural iron ore is as follows:

| | Percent |
|---|---|
| $SiO_2$ | 3.96 |
| BaO, acid soluble | 68.19 |
| BaO, water soluble | 47.80 |
| S—calc. to $BaSO_4$ | 13.97 |
| $Fe_2O_3$ | 10.49 |
| $Al_2O_3$ | 0.95 |
| CaO | 2.00 |
| $CO_2$ | 0.25 |

By the use of this reagent I am able to introduce simultaneously into the water to be treated a softening agent, a sulphate precipitating agent, and a coagulating agent, as illustrated by the following equation:

$$BaO \cdot Fe_2O_3 + 4H_2O + MgSO_4 = BaSO_4 + Mg(OH)_2 + 2Fe(OH)_3$$

It is thus seen that by means of the alkalinity produced by the hydrolysis of the ferrite:

$$BaO \cdot Fe_2O_3 + 4H_2O = Ba(OH)_2 + 2Fe(OH)_2$$
$$Ba(OH)_2 + MgSO_4 = BaSO_4 + Mg(OH)_2$$

the magnesium sulphate hardness is precipitated as insoluble magnesium hydroxide and the water thus softened to this extent and that the sulphate ions ($SO_4$) are removed as insoluble barium sulphate. The ferrite content of the reagent at the same time is thrown out in the sludge as ferric hydroxide and there has thus been a reduction in dissolved solids equivalent to the original magnesium sulphate present.

An analogous result is obtained when there are present in the water both calcium sulphate and calcium bicarbonate as illustrated by the equation:

(1)  $CaSO_4 + BaO \cdot Fe_2O_3 + 4H_2O = BaSO_4 + Ca(OH)_2 + 2Fe(OH)_3$
(2)  $Ca(HCO_3)_2 + Ca(OH)_2 = 2CaCO_3 + 2H_2O$
(1)+(2)  $CaSO_4 + Ca(HCO_3)_2 + BaO \cdot Fe_2O_3 + 2H_2O = BaSO_4 + 2CaCO_3 + 2Fe(OH)_3$ Both the calcium sulphate and the calcium bicarbonate are thus wholly removed from the water to the limit of the solubility of calcium carbonate and the dissolved solids are proportionately reduced.

My process is therefore entirely different from the usual softening process whereby soda ash is used to remove the calcium sulphate and wherein there is only an exchange of sodium ions for calcium ions and hence no reduction in dissolved solids as appears from the following equation:

$$CaSO_4 + Na_2CO_3 = CaCO_3 + Na_2SO_4$$

For those waters which contain calcium bicarbonate in excess of the calcium sulphate equivalent, I recommend the use with the barium ferrite of lime in amount equivalent to this excess of calcium sulphate whereby the same results are accomplished and it is true that the majority of natural waters are of this type.

In case magnesium bicarbonate is present in the water to be treated this is completely removed to the limit of solubility of barium carbonate:

$$Mg(HCO_3)_2 + 2BaO \cdot Fe_2O_3 + 6H_2O = Mg(OH)_2 + 2BaCO_3 + 2Fe(OH)_3$$

A further advantage of my process is the fact that in the usual lime soda process it is rarely possible to reduce the hardness of the water much below four grains without the use of a coagulant and catalyst whereas the data in the table attached hereto show that the barium ferrite does actually act as a coagulant and catalyst to reduce the hardness to a point below that obtained by lime and soda alone. Data are also included in this tabulation of typical data from a large number of tests comparing results using other common coagulants.

It is evident from these data that barium ferrite, although not so effective a coagulant as sodium aluminate, nevertheless does reduce the hardness and excess alkalinities when used with lime and soda below that obtained without such a catalyst, and also that it is an effective softening agent, either alone or with other reagents, and that it has the added valuable effect of reducing the sulphate and dissolved solids contents much below those in the same water treated with other reagents.

From the above it will be noted that there is present in the commercial material above suggested both barium silicate and barium ferrosilicate. Both of these compounds have the water softening and coagulating effect of the barium ferrite to a greater or less degree. Under some circumstances it might even be desirable to segregate them and use them together or separately or use either one of them with barium ferrite. In any event the reactions resulting from their use are of the same general character and same general order as the reactions disclosed in the equations above set out.

*Barium ferrite as softening agent and coagulant*

| Water | Treatment—grains per gallon | | | | Analysis of water—grains per gallon | | | | | | | | |
|---|---|---|---|---|---|---|---|---|---|---|---|---|---|
| | $Ca(OH)_2$ | $Na_2CO_3$ | Sodium aluminate | Barium ferrite | H. | G. P. | P. | M. | pH | O | S. | D. S. | $Na_2SO_4$ |
| LaGrange | | | | | 44.0 | 27.2 | | 22.0 | | | | 55.5 | 29.7 |
| Treatment 1 | 35.2 | 23.2 | | | 2.6 | | 5.1 | 6.1 | | 4.1 | 3.5 | 37.2 | 29.7 |
| Treatment 2 | 33.3 | 22.3 | 3.5 | | 0.5 | | 4.0 | 5.5 | 10.2 | 2.5 | 5.0 | 38.2 | 28.1 |
| Treatment 3 | 34.6 | 23.2 | | 1.4 | 1.2 | | 4.5 | 5.7 | 10.4 | 3.3 | 4.5 | 35.4 | 28.7 |
| Treatment 4 | 16.8 | 4.9 | | 60.0 | 1.2 | | 5.0 | 6.5 | | 3.5 | 5.3 | 10.8 | 0 |
| Treatment 5 | | 4.0 | | 115.0 | 1.7 | | 4.2 | 6.4 | 10.2 | 2.0 | 4.7 | 11.3 | 0 |
| Bellwood | | | | | 28.8 | 16.0 | | 15.3 | | | | 42.1 | 20.3 |
| Treatment 1 | 25.0 | 12.0 | | | 4.5 | 1.5 | 4.4 | 7.4 | 10.2 | 1.4 | 2.9 | 25.4 | 20.4 |
| Treatment 2 | 23.0 | 12.0 | 3.5 | | 0.5 | | 2.9 | 5.8 | 10.0 | | 5.3 | | 19.8 |
| Treatment 3 | 24.0 | 11.5 | | 2.8 | 2.4 | 1.4 | 4.2 | 5.8 | 9.7 | 2.6 | 3.4 | | |
| Treatment 4 | 24.0 | 11.5 | | 1.4 | 3.0 | 1.4 | 4.1 | 6.2 | 10.2 | 2.0 | 3.2 | 25.7 | 18.6 |
| Treatment 5 | 3.0 | | | 70.0 | 2.2 | | 4.6 | 6.3 | | 2.9 | 4.1 | | 0 |
| Treatment 6 | 3.0 | | 0.5 | 65.0 | 1.5 | | 3.8 | 6.4 | | 1.2 | 4.9 | 11.5 | 0 |

H=total hardness; G. P.=ghost point or calcium hardness.
P=phenolphthalein alkalinity; M=methyl orange alkalinity.
O=hydrate alkalinity=2P−M.
S=soda alkalinity=M−H.
D. S.=dissolved solids.

I claim:
1. The process of treating liquids which consists in adding barium ferrite to the liquid to be treated.
2. The process of treating water which consists in adding to it barium ferrite and lime.
3. The process of treating water which consists in adding to it barium ferrite and soda ash.
4. The process of treating water which consists in adding to it barium ferrite and lime and soda ash.

5. The process of treating liquids which consists in adding to the liquid, the product resulting from heating a mixture of barium carbonate and iron oxide.

6. The process of treating liquids which consists in adding barium ferrite and barium silicate to the liquid to be treated.

7. The process of treating liquids which consists in adding barium ferrite and barium silicoferrite to the liquid to be treated.

GAIL J. FINK.